No. 731,297. PATENTED JUNE 16, 1903.
T. GALLAGHER.
STONE DRESSING MACHINE.
APPLICATION FILED FEB. 27, 1902.
NO MODEL.
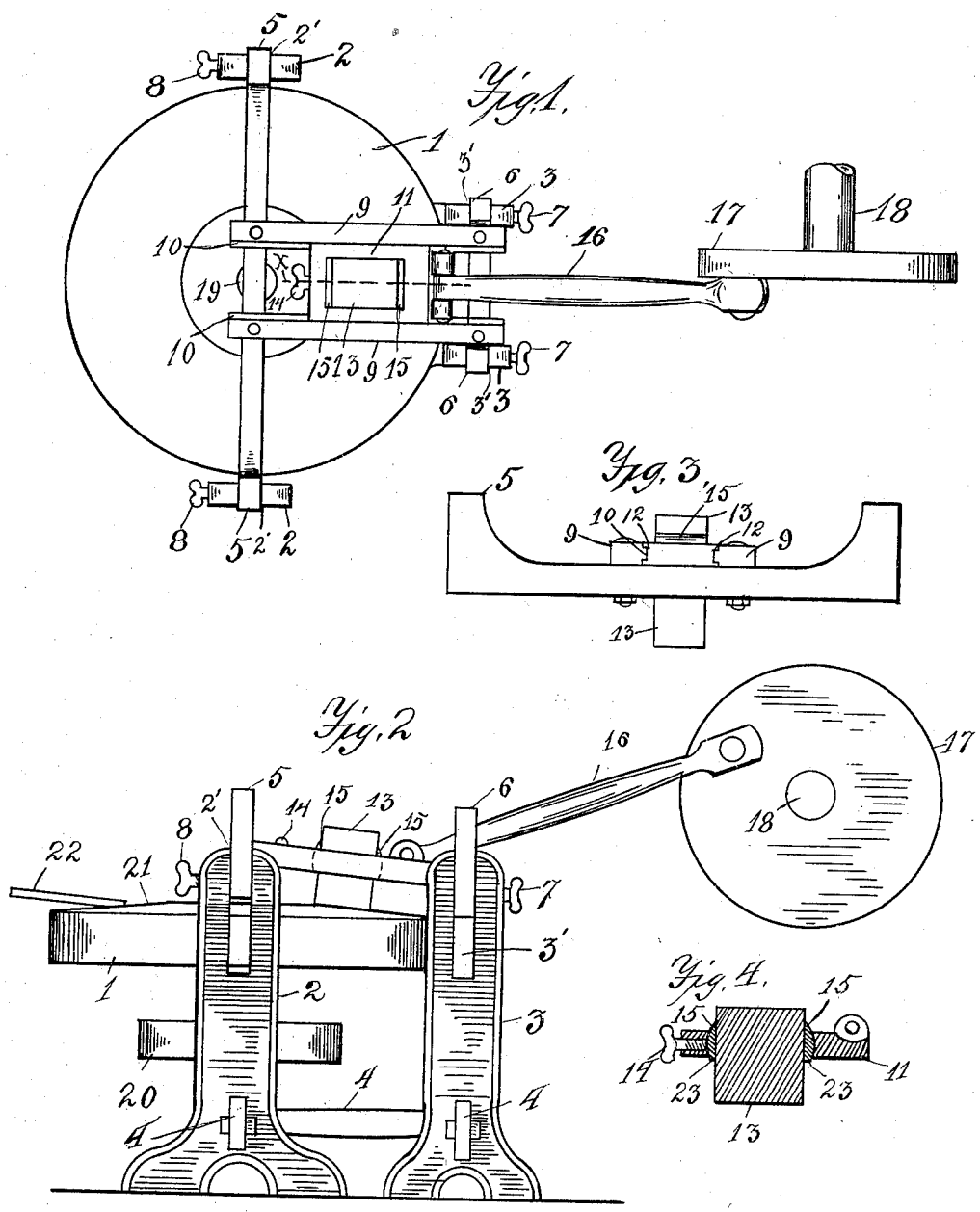
WITNESSES:
A. W. Kittle
L. T. Baldwin
INVENTOR
Thomas Gallagher
BY
S. Arthur Baldwin
ATTORNEY No. 731,297.

Patented June 16, 1903.

UNITED STATES PATENT OFFICE.

THOMAS GALLAGHER, OF FALCONER, NEW YORK.

STONE-DRESSING MACHINE.

SPECIFICATION forming part of Letters Patent No. 731,297, dated June 16, 1903.

Application filed February 27, 1902. Serial No. 95,998. (No model.)

*To all whom it may concern:*

Be it known that I, THOMAS GALLAGHER, a citizen of the United States, and a resident of the town of Falconer, in the county of Chautauqua and State of New York, have invented a new and useful Stone-Dressing Machine, of which the following is a specification.

My invention relates to machines for grinding or abrading stone; and the objects of my improvement are, first, to provide a machine whereby the surface of a glass-beveler's stone shall be kept perfectly true or dressed, and, second, to provide means whereby the stone may be dressed at any desired angle.

At present it is customary for glass-bevelers to frequently stop and dress their stones by hand on account of the hard glass hollowing out the surface of the stones, making them untrue. My dressing-machine keeps the stone always dressed, and thus much more and better work can be done. It does not cut away the stone as fast as the hand method of dressing. I attain these ends by mechanism as illustrated in the accompanying drawings, in which—

Figure 1 is a plan view of my machine. Fig. 2 is a side elevation of machine. Fig. 3 is a side elevation of cross-bar with guide-rails attached. Fig. 4 is a sectional view at line X in Fig. 1.

Similar numerals refer to similar parts in the several views.

1 is the grinding or abrading stone, which is supported in a frame composed of the two main uprights 2 2 and the lesser ones 3 3, which are held together by the lower cross-bars 4 4. The upper adjustable cross-bars 5 6 also assist in giving the required rigidity to the frame and sustain the guide-rails 9 9. Bars 5 and 6 are made adjustable in slots 2' and 3' by set or thumb screws 7 and 8, sufficient play or room being allowed for such adjustment. Rails 9 have tongues 10 on their inner sides to fit grooves 12 in carriage 11 in its reciprocal motion.

Within an opening in the center of carriage 11 block 13 is adjustably secured by set or thumb screw 14 and the segments 15 15 on each side block 13. The bearing of segments 15 on carriage 11 at each end of the opening are curved to receive the curved side of the segment 15. (See Fig. 4.) Set-screw 14 bears against the segment, and thus in combination with adjustable bars 5 and 6 holds block 13 at any desired angle. Carriage 11 is given a reciprocal motion by arm 16 and crank-wheel 17 on shaft 18. Stone 1 is mounted on shaft 19 and turned by pulley 20 on said shaft. The upper side of the stone 1 is made at an angle 21, the better to cut the bevel on the glass 22. Bars 5 and 6 are made wide at each end to give larger bearing for the set-screws and are made adjustable to give any desired angle to the upper grinding-surface of stone 1. It will be recognized that with stone 1 revolving at about two hundred revolutions per minute and block 13 given a moderate reciprocal movement at the angle of incline the grinding-surface will be kept perfectly true at the desired angle. For block 13 I prefer an emery or carborundum block, though other abrasive materials might be used.

To adjust bars 5 and 6 and the guide-rails and carriage for block 13, the block is adjusted with its lower surface parallel to the guide-rails and firmly clamped in position. The cross-bars 5 and 6 are then freed by unscrewing screws 7 and 8 and the whole frame dropped down until block 13 rests on stone 1 on the angle 21, which would give the frame the desired angle. Other forms of wedges or clamping-pieces might be used in place of segments 15 and not depart from my invention; but the purpose of segments 15 is to accomplish slight adjustments of block 13 to stone 1 without readjusting the whole frame and the four set-screws 7 and 8. The block is adjusted for slight inaccuracies by dropping the block onto the stone and turning up set-screw 14, thus adjusting and holding the block accurately in position at the same time. The lower edges 23 of segments 15 are cut even with the lower side of carriage 11, so that block 13 may be worn away nearly to carriage 11 and almost entirely used up.

I claim as new—

In a stone-dressing machine, the combination of a frame composed of two pairs of uprights having slotted tops and suitable connections, a glass-beveler's abrading-stone revolubly mounted in said frame, the uprights of one of said pairs placed on opposite sides of said stone, cross-bars adjustably mounted in the slotted tops of said pairs of uprights, guide-rails secured on said cross-bars, a carriage slidably mounted on said guide-rails, an arm and crank-wheel to give a reciprocating motion to said carriage, and an abrasive block adjustably mounted in said carriage, substantially as and for the purpose specified.

In testimony whereof I have signed my name to this specification in the presence of two subscribing witnesses.

THOMAS GALLAGHER.

Witnesses:
S. A. BALDWIN,
GEO. H. BENSON.